United States Patent [19]
Anderson et al.

[11] 3,967,073
[45] June 29, 1976

[54] PBX AUTOMATIC NUMBER IDENTIFICATION SYSTEM

[75] Inventors: Harold Peter Anderson, Boulder; George Albert Lesser, Lakewood, both of Colo.; Fredric Lukas, Chatsworth, Calif.; Rodney Robert Maxon; James Hall Viamour, both of Boulder, Colo.

[73] Assignee: Bell Telephone Laboratories, Incorporated, Murray Hill, N.J.

[22] Filed: Jan. 9, 1975

[21] Appl. No.: 539,828

[52] U.S. Cl. ............................................ 179/18 FH
[51] Int. Cl.² .......................................... H04Q 3/72
[58] Field of Search....... 179/18 FH, 27 CA, 27 CB, 179/27 DB, 1 H, 18 D, 18 DA; 178/3

[56] References Cited
UNITED STATES PATENTS

| | | |
|---|---|---|
| 3,469,021 | 9/1969 | Dahlblom et al. ...................... 178/3 |
| 3,725,596 | 4/1973 | Maxon et al. ..................... 179/18 FH |
| 3,746,797 | 7/1973 | Meise, Jr. et al. ............... 179/18 FH |
| 3,749,844 | 7/1973 | Dufton ............................ 179/18 FH |

*Primary Examiner*—Thomas A. Robinson
*Attorney, Agent, or Firm*—D. M. Duft

[57] ABSTRACT

A PBX is disclosed having automatic number identification (ANI) equipment for generating signals which identify the calling station and trunk numbers of outgoing calls. A memory is interconnected with the ANI equipment for storing the identification signals prior to transmission to a central office. The memory can store up to five sets of identification signals and aids in preventing dial tone delay by decreasing the probability that the ANI system will become overloaded due to central office delay.

13 Claims, 18 Drawing Figures

FIG. 11
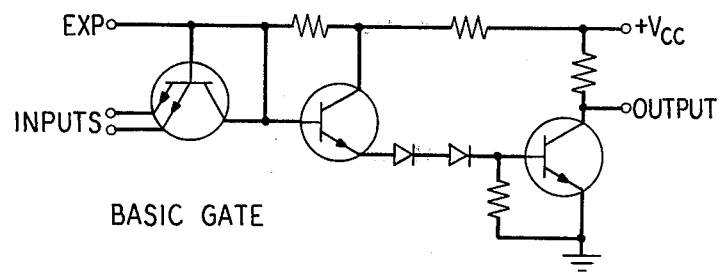
BASIC GATE
FIG. 12
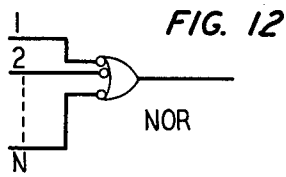
NOR
FIG. 13
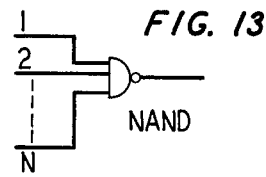
NAND
FIG. 14
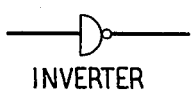
INVERTER
FIG. 15
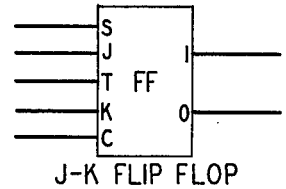
J-K FLIP FLOP
FIG. 16
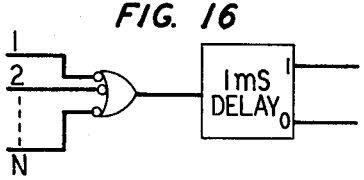
FIG. 17
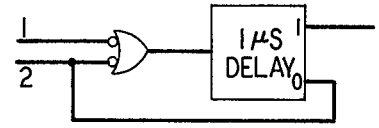
FIG. 18
| FIG. 4 | FIG. 8 | FIG. 9 |
|---|---|---|
| FIG. 5 | FIG. 7 | FIG. 10 |
| FIG. 6 | FIG. 2 | FIG. 3 |

3,967,073

PBX AUTOMATIC NUMBER IDENTIFICATION SYSTEM

BACKGROUND OF THE INVENTION

This invention relates to a telephone system and, in particular, to a private branch exchange (PBX) system having a memory for temporarily storing the identifications of the calling station and trunk used on calls outgoing to a central office.

DESCRIPTION OF THE PRIOR ART

Presently there exist arrangements with automatically provide identifications of the calling station and trunk used for outgoing calls in PBX's. This equipment is commonly referred to as Automatic Number Identificaton (ANI) equipment and a typical prior art arrangement for performing this function is disclosed in U.S. Pat. No. 3,725,596 issued to R. R. Maxon et al on Apr. 3, 1973. In the Maxon et al arrangement a station user dials a predetermined digit, usually a nine, to signal the PBX common control equipment that the user intends to place a call to an outside number. If the associated ANI equipment is not busy, dial tone is returned to the user. Concurrently, the PBX common control equipment selects an idle outgoing trunk circuit and identifies the calling station line circuit and the selected outgoing trunk circuit. A connection is then established between the two circuits through the PBX network. Immediately subsequent to the establishment of this connection the station and trunk circuit identifications are transmitted to the ANI equipment at the PBX. Subsequently, in the same manner as described in the Maxon et al patent, the ANI information is transmitted to the central office over a path separate and apart from the voice path over which the call itself is extended to the central office.

Although the ANI system described in Maxon et al operates satisfactorily under most circumstances a problem can arise when the ANI equipment is either overloaded or the central office is unable to handle ANI identifications at that particular time. When either of these situations occurs the PBX common control equipment will not return dial tone to any station user requesting service on an outside call since the ANI equipment cannot make an identification. Thus, a PBX subscriber can possibly be denied service because of a temporary malfunction in the telephone company's central office.

It is, therefore, an object of the present invention to provide improved automatic number identification equipment in a private branch exchange.

It is a further object to provide an automatic number identification arrangement which will minimize the possibility of a dial tone delay.

SUMMARY OF THE INVENTION

In accordance with the principles of the present invention, in one illustrative embodiment thereof, a memory store is interconnected with the ANI circuitry and the PBX common control circuitry for storing calling identification information.

When a PBX station user wishes to initiate an outside call, that is a call to a telephone subscriber not directly serviced by the PBX, a predetermined code, typically the "nine" digit, is dialed. This code signals the PBX common control equipment that an outside call, or a "dial-9" call, is being initiated and the control equipment determines whether the ANI equipment is idle before it proceeds further with the call. If the ANI equipment is idle, the control equipment causes a connection to be made between the calling station and an idle outgoing central office trunk circuit. Immediately subsequent to establishment of this connection, the identification of the calling station and interconnected trunk is made. Under control of ANI control and address circuitry the identifications are then written into a memory at a particular location in the memory.

The stored identifications are read from memory and transmitted to the central office when the central office signals that it is available to receive the information. The identification information is read from the memory and transmitted to the central office over a path separate and apart from the voice path over which the telephone call is extended to the central office in the same manner as described in the Maxon et al patent.

A feature of our invention is the provision of circuitry for converting the identification information into binary code for faster storage in memory.

A further feature of our invention is the provision of circuitry to record information from memory in parallel with the path establishment functions of the PBX.

An additional feature of our invention is the provision of a random access memory as a memory for faster read and write cycles.

These and other objects and features of the invention will become more apparent upon a reading of the following description thereof taken in conjunction with the drawings in which:

FIG. 1 is a block diagram of the instant ANI arrangement as used in conjunction with a PBX;

FIG. 2 discloses the ANI control circuitry comprising the input address counter;

FIG. 3 discloses the memory address circuitry comprising the write address counter and the read address counter;

FIG. 4, 5 and 6 disclose multiplexer circuits;

FIG. 7 discloses the memory address circuitry;

FIG. 8 discloses the random access memory;

FIG. 9 discloses the read and transmission control circuitry;

FIG. 10 discloses the digit and 5-bit counter circuitry;

FIG. 11 discloses a basic transistor logic circuit;

FIG. 12 illustrates a NOR gate;

FIG. 13 illustrates a NAND gate;

FIG. 14 illustrates an inverter circuit;

FIG. 15 illustrates a J-K flip-flop;

FIG. 16 illustrates a delay circuit;

FIG. 17 illustrates a monopulser circuit; and

FIG. 18 shows the manner in which FIG. 2 through 10 should be placed together in order to demonstrate the way in which the various system components cooperate.

Figure 1:
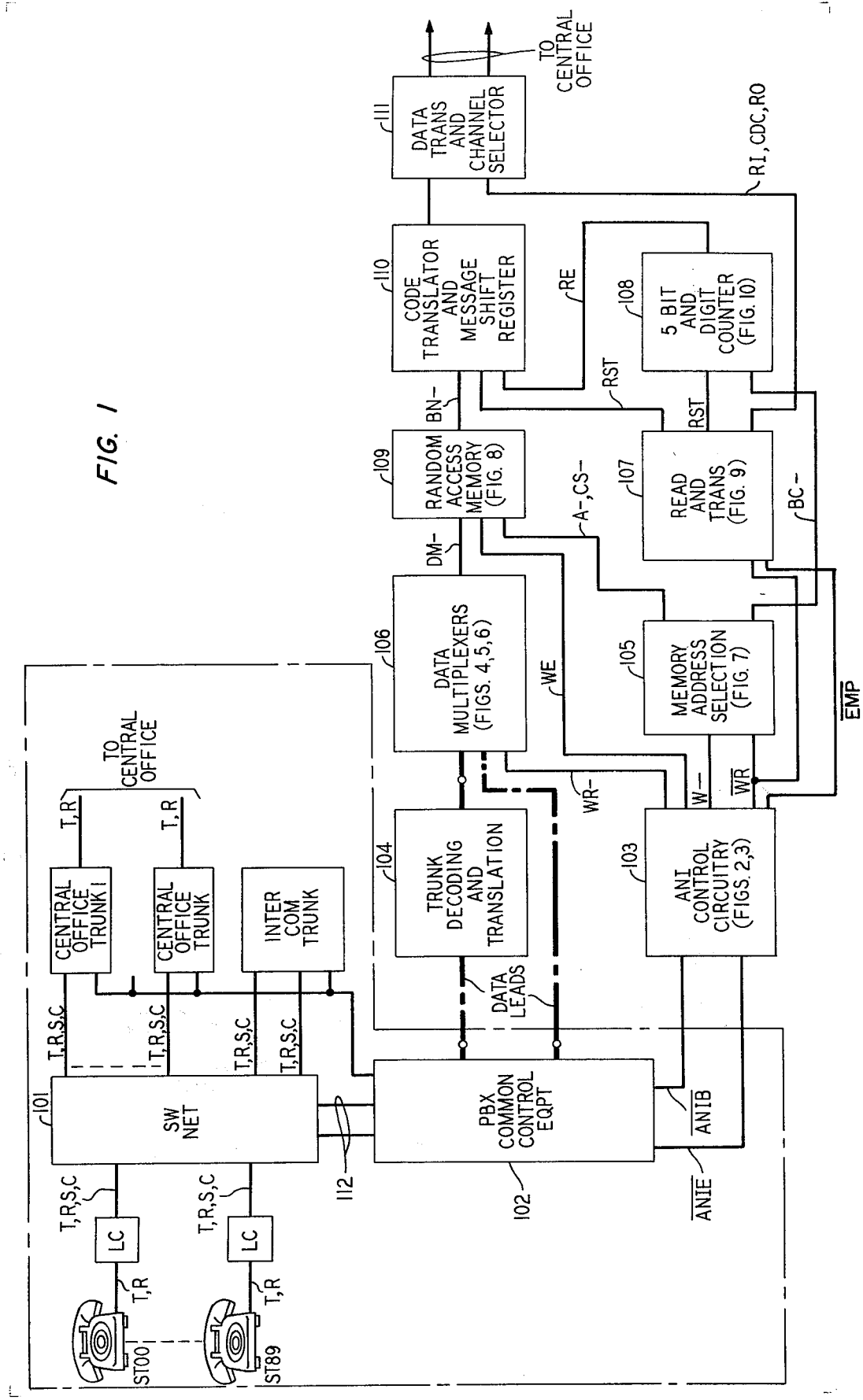

The disclosed system makes extensive use of transistor logic circuits in which a single stage is used as an inverter, inverting AND gate or an inverting OR gate, depending upon the nature of the input signals applied thereto and the function to be performed by the stage. FIG. 11 discloses a schematic of a circuit which is basically a single stage inverter since a negative signal applied to an input of the device appears as a positive going signal at the output and vice versa.

The stage may be used as an inverting OR gate, commonly called a NOR gate, as shown in FIG. 12, by having the circuit output normally low (ground), with all inputs high (positive). In this case a negative going signal applied to one or more input leads will turn the output transistor off and provide a positive going, or high, signal on the output. The stage may also be operated as an inverting AND gate, commonly called a NAND gate, as shown on FIG. 13. In this case, the output transistor is normally held off by a low signal on one or more inputs, making the output high. When all input signals go high, the output transistor turns on, causing the output to go low.

The circuit of FIG. 13 may also be operated as a single input inverter as shown in FIG. 14.

FIG. 15 discloses the J-K flip-flop. With the signals on both inputs S and C low, a low-going pulse on input T controls the 1- and 0-outputs in the following manner, dependent on the present state of the outputs and inputs J and K.

| INPUTS | | OUTPUTS BEFORE PULSE ON LEAD T | | RESULTING OUTPUTS AFTER PULSE | |
|---|---|---|---|---|---|
| J | K | 1-OUTPUT | 0-OUTPUT | 1-OUTPUT | 0-OUTPUT |
| 0 | 0 | 0 | 1 | 0 | 1 |
| 0 | 0 | 1 | 0 | 1 | 0 |
| 0 | 1 | 0 | 1 | 0 | 1 |
| 0 | 1 | 1 | 0 | 0 | 1 |
| 1 | 0 | 0 | 1 | 1 | 0 |
| 1 | 0 | 1 | 0 | 1 | 0 |
| 1 | 1 | 0 | 1 | 1 | 0 |
| 1 | 1 | 1 | 0 | 0 | 1 |

(0=low state; 1=high state)

Inputs S and C inhibit the control of the outputs by lead T when either is high and cause the following output state. Lead S high causes the 1-output to be high and the 0-output to be low. Lead C high causes the 0-output to be high and the 1-output to be low. With both S and C inputs high, the outputs are indeterminate.

FIG. 16 depicts a time delay circuit. When all inputs are high the "one" output is low and the "zero" output is high. If the signal on one or more inputs goes low for a period greater than the time delay of the circuit, in this instance 1 millisecond, the signals on output leads one and zero change to high and low, respectively, and stay changed for as long as the input signal remains low.

FIG. 17 discloses a monopulser. Normally all inputs are high, the zero output is high and the one output is low. If one input goes low, the output signals reverse immediately, zero low, one high, and remain that way for amount of delay shown on circuit, i.e., 1 millisecond, all inputs must go high before the circuit can be triggered again.

A modulo 3 counter is a counter which counts through a three-state cycle and returns to the initial state.

A modulo 5 counter is a counter which counts through a five-state cycle and returns to the initial state.

A more detailed description of the above circuits may be found in *The Design of Digital Systems*, by John B. Peatman, McGraw-Hill, New York, N.Y., 1972.

FIG. 1 - General Description

FIG. 1 discloses a specific embodiment of our invention as embodied in a wired logic electronic type PBX of the type disclosed in detail in U.S. Pat. No. 3,377,432 to H. H. Abbott et al of Apr. 9, 1968, and also disclosed in U.S. Pat. No. 3,725,596, issued to R. R. Maxon et al on Apr. 3, 1973.

The system comprising out invention includes an end marked network which is designated as element 101 on FIG. 1. It further includes a plurality of PBX stations ST00 through ST89, each of which is connected to a line circuit designated LC. The line circuits are well known in the art and are used for relaying signaling and supervisory signals to the switching network and to the PBX common control equipment 102. The line circuits are periodically scanned by the PBX common control equipment to determine the current conductive states of the line circuits and thereby determine the busy-idle status of the associated PBX station. The disclosed embodiment also includes a plurality of central office trunks, e.g., Central Office Trunk 1 and an intercom trunk circuit. The PBX stations are interconnected through the line circuits LC to the left side of the switching network 101, while the central office trunk and intercom trunk circuits are connected to the right side of the switching network. Switching network 101 is of the end marked type and, in response to the presence of a marking potential on each side thereof, it establishes independently of the remainder of the system a network interconnection between the circuits associated with the marked terminals.

The disclosed system is of the common control type in which the common control 102 governs the order in which the various circuits are interconnected via the network during the servicing of each call initiated by a PBX station subscriber. As described in detail in the Abbott et al patent, common control equipment 102 controls the establishment of the switching network 101 connection between the circuit requesting service and any circuit of the system with which the requesting circuit must be connected. The servicing of a call usually requires that the establishment of a plurality of network connections be made sequentially.

The system of FIG. 1 also includes automatic number identification (ANI) circuitry 103 to 111. This circuitry is involved with receiving the call identification data from the associated PBX system and storing it in the random access memory 109 for later transmission to the central office.

Assuming a subscriber at PBX station ST10 is going to initiate a call to the local central office, which is commonly called a dial-9 call, the telephone receiver is lifted, the local PBX dial tone is received and the station subscriber dials the access code dial-9. At this time common control circuitry 102 of the PBX determines that it is a dial-9 call requiring automatic number identification. Common control circuitry 102 interrogates $\overline{\text{ANIB}}$ lead, FIG. 1. If the signal on this lead is low, common control circuitry 102 will deny the dial-9 call, since the low signal indicates that the ANI equipment, namely, random access memory 109, is full and can accept no more identifications at this time. In this case common control circuitry 102 prohibits the return of central office dial tone to the calling subscriber, ST10.

Figure 4:
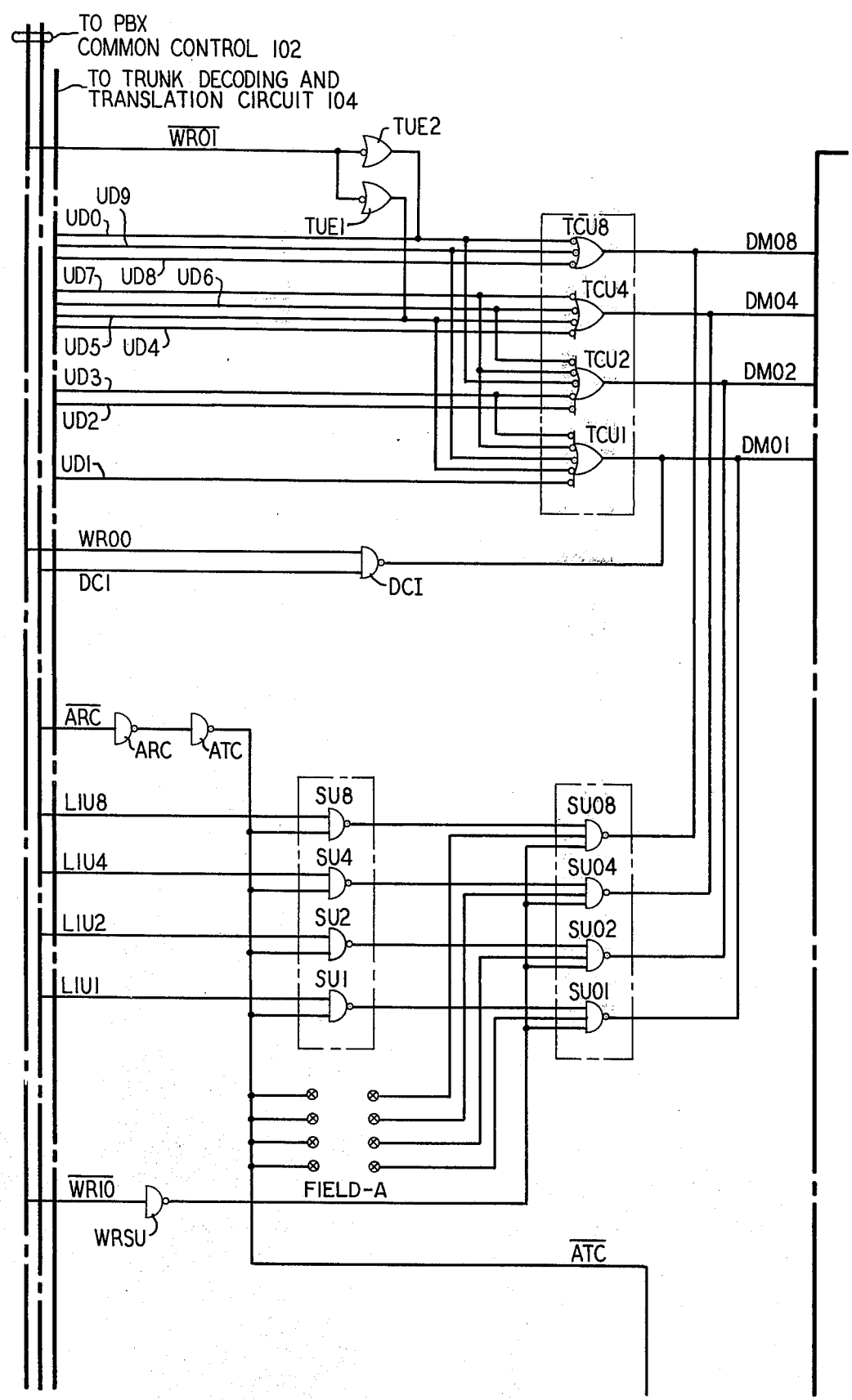
Figure 5:
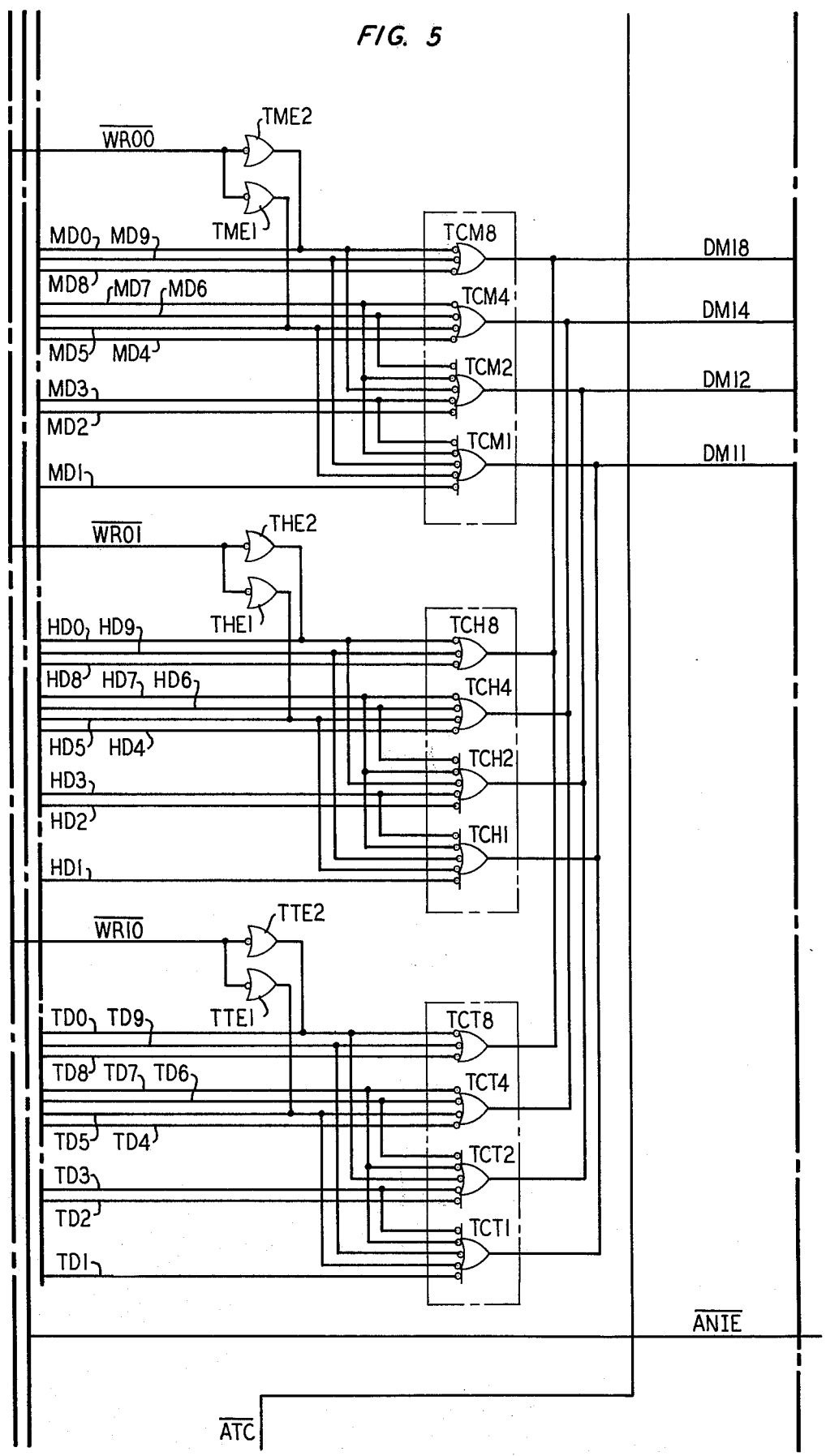
Figure 6:
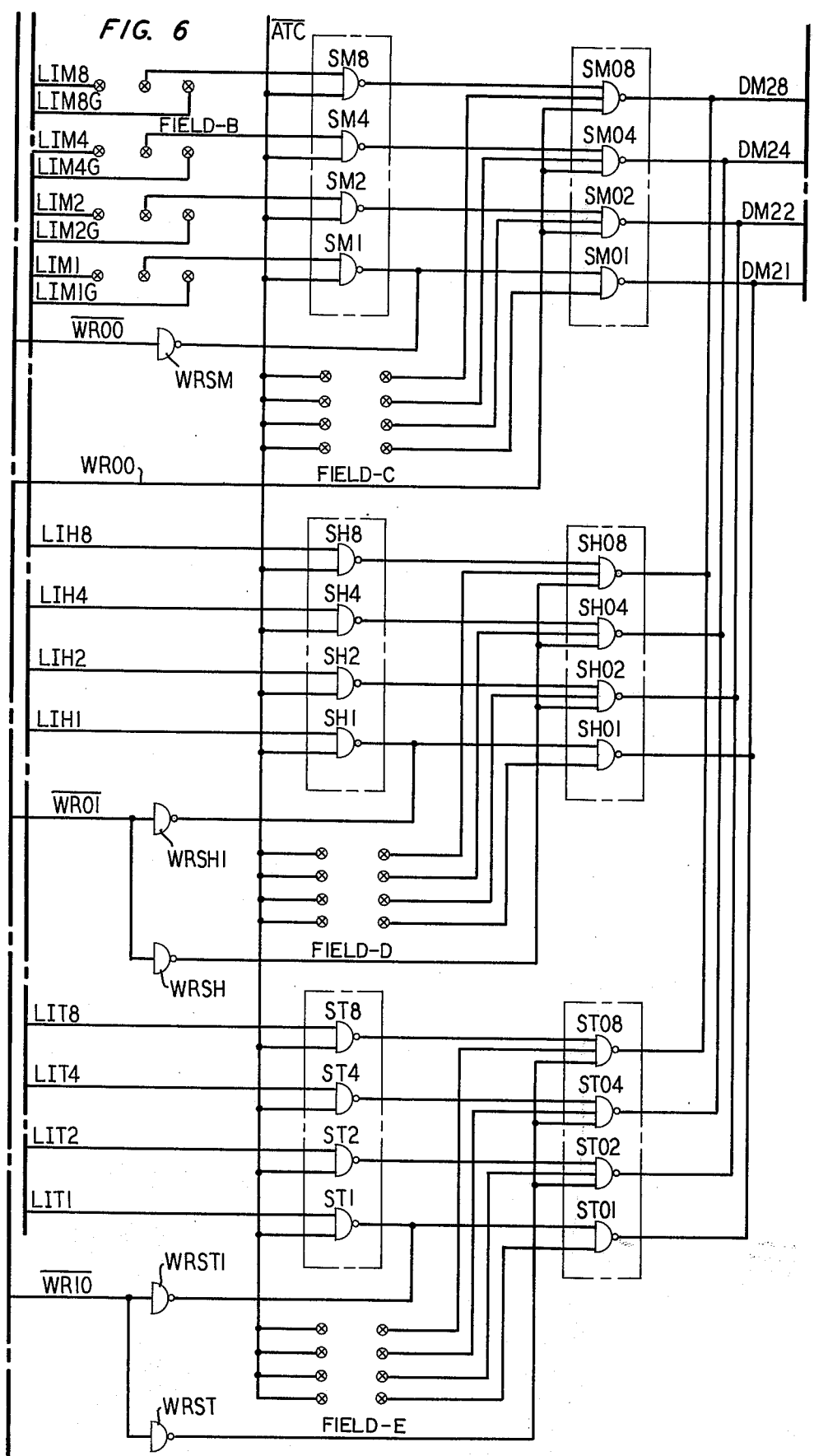

On the other hand, if the signal on $\overline{\text{ANIB}}$ lead is high, common control circuitry 102 senses that the ANI equipment can handle the dial-9 call being initiated by station ST10. Common control 102 then enables the $\overline{\text{ANIE}}$ lead to signal ANI control circuitry 103 that an ANI type call is to be processed. As explained above and described in the Maxon et al patent, control circuit equipment 102 also has developed the identification data relating to the calling station ST10 and the selected outgoing trunk circuit, i.e., Central Office Trunk 1. This identification data, shown in FIG. 4–6, is transmitted on leads UD-, TD-, HD-, and MD-, which identify the trunk circuit involved; the DCI lead which identifies which data channel the ANI circuit is required to transmit over, and leads LIU-, and LIT-, LIH- and LIM-, FIG. 6, which identify the calling station. Thus, when PBX common control equipment 102 makes the $\overline{\text{ANIE}}$ lead active the data needed for the call identification is present on DATA leads of FIG. 1.

In this exemplary embodiment of an invention there exists a plurality of data lines to a Central Office. Our invention will operate equally well where only one data line exists. Thus, herein information is developed by PBX common control equipment 102 concerning which data channel of the two data channels in the present embodiment is to be used to transmit the identification data and this information is present on lead DC1 of FIG. 4 as a single data bit.

The identification of the trunk circuit involved in the connection is decoded by trunk decoding and translation circuit 104, which identifies the trunk circuit in terms of trunk position in the trunk switch unit within the PBX. Trunk decoding and translating circuit 104 can be any circuit well known in the art; see, for example, the Maxon et al patent. The trunk identification data received from PBX common control 102 data is translated by translation circuit 104 to a four digit binary coded number. The station code is already present in binary form on data leads, FIG. 1, on leads LIU-, LIT-, LIH- and LIM-, FIG. 4, and 6 and is thus already available for storage in binary form. Thus, a four digit trunk number, a four digit station number plus a single bit identifying which of two data channels are to be used for the transmission of the ANI data to the central office is now available for writing into random access memory 109.

Figure 8:
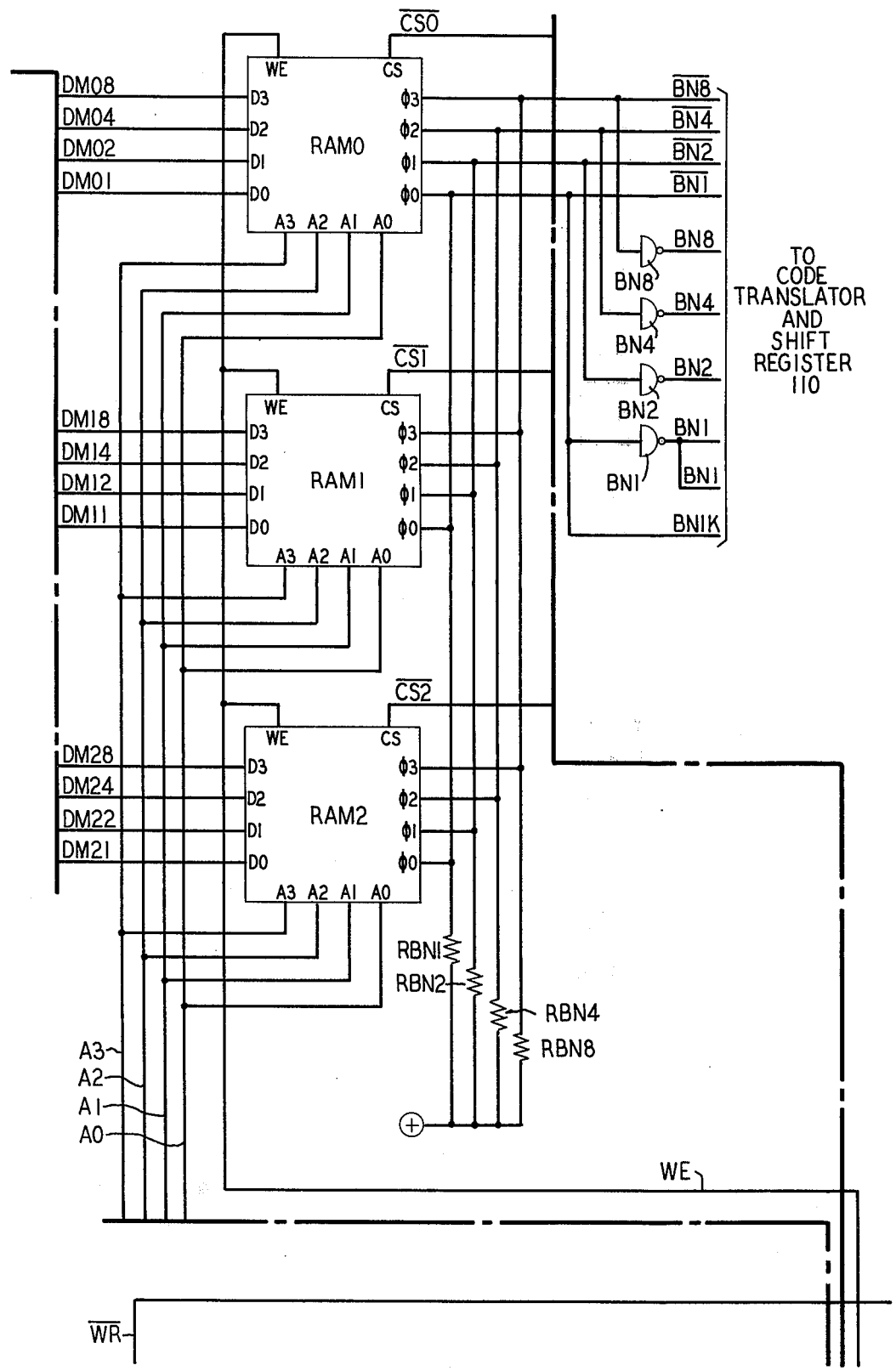

The writing or storing of the ANI data in random access memory 109 is accomplished under control of ANI control circuitry 103, memory address selection circuit 105 and data multiplexers 106. In the present embodiment, random access memory 109 is arranged for storing a maximum of five call identification sets of information. Random access memory 109 is a solid state arrangement comprising three memory devices each having 64 flip-flops arranged in a 16 × 4 matrix. That is, there are 16 separate addresses for each memory device, and each device having has the capability of storing four bits of information in each location. To enable the storage of five call identifications, with each call identification comprising four trunk digits, four station code digits plus the identification of which data channel to use, the three random access memory devices RAMO-2 on FIG. 8 are arranged in a 16 × 4 bit word arrangement in parallel. The memory location in which each call identification is stored is controlled by memory address circuit 105.

Simultaneously, when common control 102 of the PBX establishes the dial-9 connection and random access memory 109 is not full, the $\overline{\text{ANIE}}$ enable lead goes low and causes ANI control circuitry 103 to generate a series of three write pulses on the write enable lead WE on FIG. 1. This causes random access memory 109 to store on three different write operations the nine digits located on the data leads DM on FIG. 1. ANI control circuitry 103 causes the data multiplexers 106 to select the proper input information to be stored at each of the locations involved by means of signals on the WR leads. Thus, as the three write pulses are generated by common control circuitry 103, each of the three data multiplexers applies to the memory 106 one digit involved in the call identification.

Whenever random access memory 109 has one or more call identifications stored awaiting transmission, read and transmission control circuitry 107 is signaled. A flip-flop in read and transmission control circuitry 107 is set and at the same time ANI control circuitry 103 signals memory address selection circuit 105 to provide the proper address to random access memory 109 to read out the data channel bit which determines the proper destination of the forthcoming message to be transmitted. A pulse on lead $\overline{\text{RI}}$ now enables data channel selection circuitry 111 to receive the data channel selection information which has been previously stored in random access memory 109. Data channel selection circuitry 111 sets the output circuitry to the proper data channel in accordance with the received data and signals the central office that the ANI circuit has a message to be transmitted. The central office responds by connecting a data receiver on the selected data channel and then returns a signal to the PBX - ANI circuit which is in the form of d.c. signaling that causes read and transmission control circuitry 107 to signal the digit counter 108 after approximately 15 milliseconds, this delay being necessary for the data channel to settle down for proper transmission. Digit counter 108 controls the rate of transmission of data over the selected data channel by changing state at the proper rate for reading information from random access memory 109.

The first digit read from random access memory 109 is the trunk code thousands digit. At this time digit counter 108 controls memory address circuit 105 to select the necessary address. Five bit counter 108 is in its initial state and a first internally generated clock pulse results in five bit counter 108 generating a pulse on lead RE which signals code translation circuitry 110. This reads the trunk thousands digit through the code translator and into the message shift register 110 in parallel form on leads BN. A translation from binary to two-out-of-five code is performed and is necessary to enable the central office equipment to check for proper or valid digits being received. The trunk thousands digit is stored in message shift register 110. The code translator may be any binary to two-out-of-five code translator well known in the art. Message shift register 110 can comprise a number of flip-flops arranged to shift data into series transmission as is well known in the art.

The next internally generated clock pulse causes message shift register 110 to serially transfer the data forward one stage in the shift register. At this time a pre-message bit which was priorly entered into the shift register, as subsequently described, is shifted to the output stage of shift register 110. This bit now causes data transmitter 111 to change frequency to a particular frequency signal, i.e., 1850 Hz, which signal indicates to the central office that a 40 bit message is to immediately follow. After five more pulses the first digit has been transmitted in two-out-of-five code form by frequency shift transmission. At this time, five bit counter 108 causes digit counter 108 to advance one state which will prepare for the readout of the next digit to be transmitted. With the digit counter advanced to another state, random access memory 109 is addressed by memory address 105 such that the trunk hundreds digit is made available on leads BN-. Thus, as five bit counter 108 advances through its second five state cycle, the trunk hundreds digit is sent via binary to two-out-of-five code translator into message shift register 110 for serial transmission to the central office.

When all eight digits representing the call identification have been transmitted, read and transmission control circuitry 107 indicates to the connected central office that the transmission is completed. The central office in turn will restore to the normal state, returning ANI circuitry to the idle state.

Detailed Description

Figure 2:
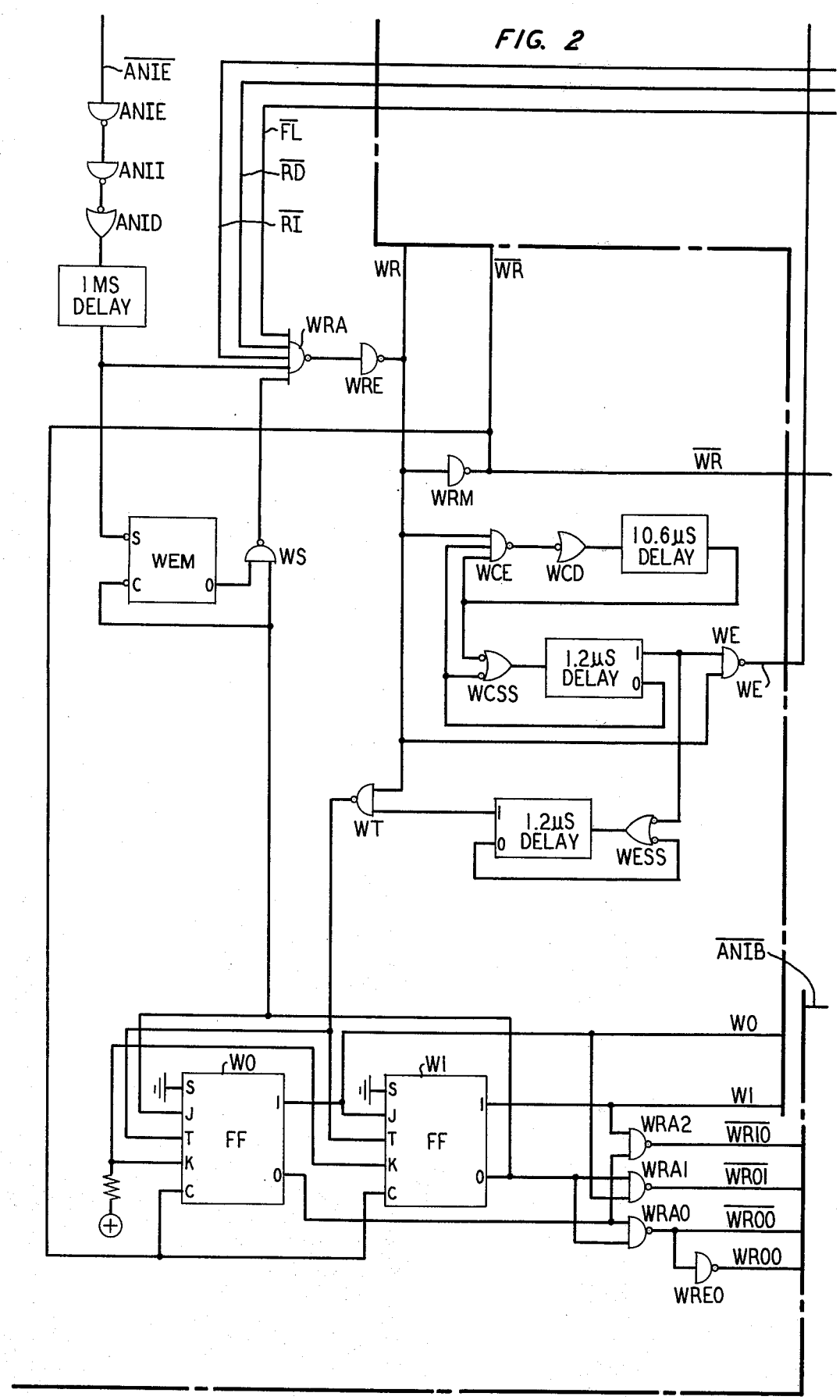

FIG. 2 - ANI Control (Input Address Counter)

Figure 3:
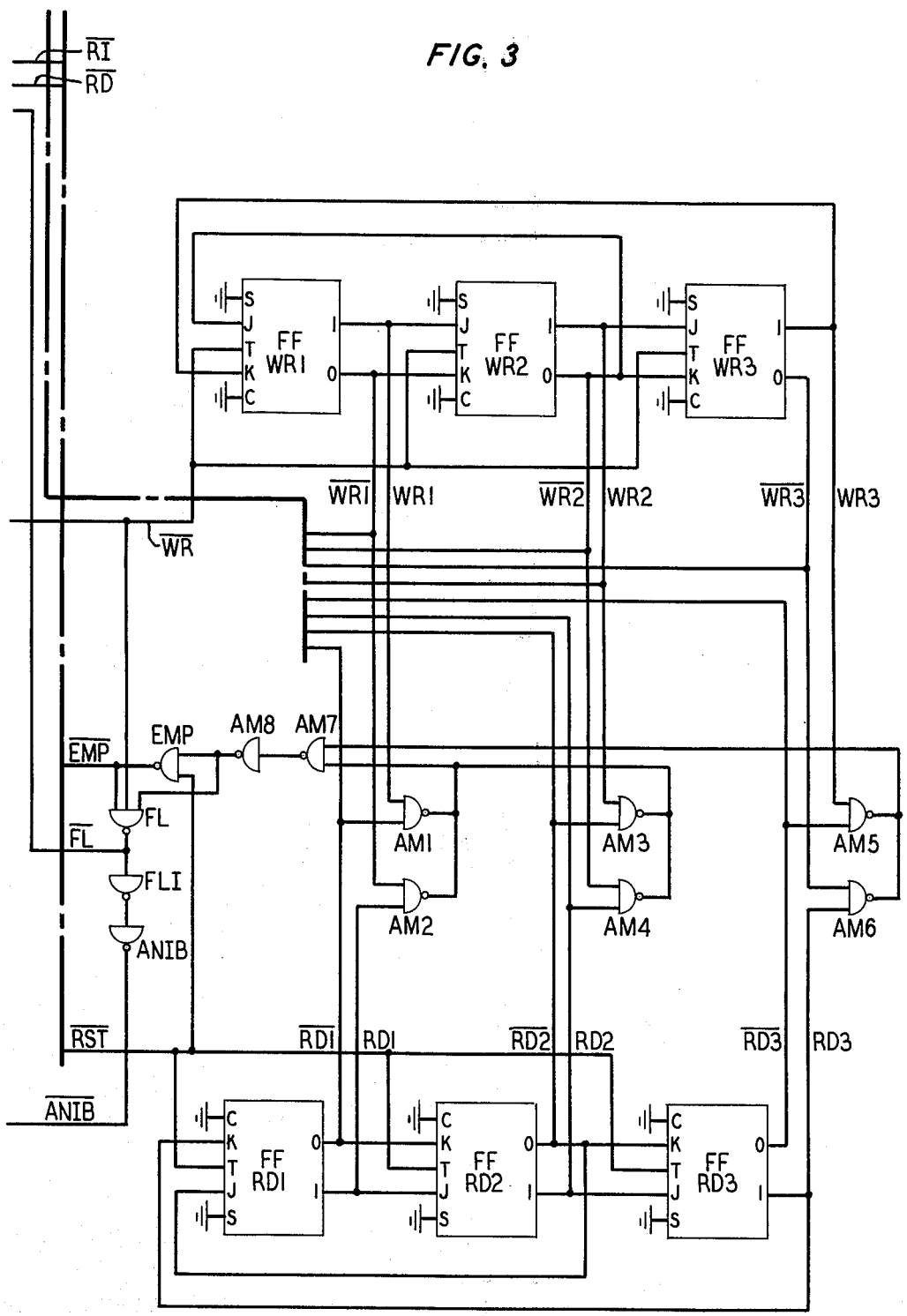

When the random access memory 109 is not full and can accept an identification for storage, the signal on lead $\overline{ANIB}$, FIG. 3, will be high as described above. When this occurs PBX common control circuit 102, FIG. 1, enables ANI control circuitry, FIG. 2, by making the signal on input lead $\overline{ANIE}$, FIG. 2, low thereby turning off gate ANIE, turning on gate ANII and starting time delay ANID. In the present embodiment, valid enable signals will remain for a period longer than 1 millisec, thus delay ANID will time out, causing its output to go high thereby removing the set signal from flip-flip WEM and partially enabling gate WRA.

Prior to this, flip-flop WEM is in the set state with the 0-output low holding gate WS off. Also, with the memory not full, as will be described in detail below, lead $\overline{FL}$ is high and provided a readout sequence from random access memory 109 is not in progress, leads $\overline{RI}$ and $\overline{RD}$ are also high. Thus, with signals on leads $\overline{FL}$, $\overline{RD}$ and $\overline{RI}$ high and when the outputs of gates ANID and WS go high, gate WRA turns on thereby turning off gate WRE. Gate WRE off:
1. turns on gate WCE,
2. places gates WE and WT under control of monopulsers WCSS and WESS, respectively,
3. turns on gate WRM to drive lead $\overline{WR}$ low, and
4. makes lead WR high.

With gate WCE on, the low output starts time delay WCD. After 10.6 microseconds, the output of the delay circuit goes low to trigger delay WCSS. The outputs of monopulser WCSS changes states with the 0-output going low to hold itself in the timing condition and hold gate WCE off. The 1-output goes high thereby turning on gate WE and removes the low signal from the input of monopulser WESS, preparing for later action. Gate WCE off permits time delay WCD to reset causing the output to go high. Gate WE on drives the signal on lead WE low.

After 1.2 microsec., monopulser WCSS times out, causing the outputs to change state again. The 0-output going high removes the low input signal permitting the monopulser to recover and turns on gate WCE. The 1-output going low turns off gate WE to make lead WE high and triggers monopulser WESS. The outputs of monopulser WESS change state with the 0-output going low to hold itself in the timing condition and the 1-output going high to turn on gate WT. After 1.2 microseconds, monopulser WESS times out causing the outputs to change state again. The 0-output going high leaves the monopulser under control of the low input from monopulser WCSS and the 1-output going low turns off gate WT. This completes one cycle of the write pulse generator, comprising the 10.6 mirosecond delay of time delay WCD, followed by a 1.2 microsecond low-going pulse on lead WE, and followed immediately by a 1.2 microsecond low-going pulse output from gate WT.

Lead WE pulsing low provides the write enable function to the random access memory 109 shown in FIG. 8. The low pulse from gate WT then toggles the input address counter to enable the next group of inputs for storage which occurs during the write enable pulse of the next pulse generator cycle. After three cycles of the pulse generator, the write control sequence is ended as described in the following.

The input address counter consists of JK flip-flops W0 and W1 arranged for a modulo-3 counting sequence. Between write sequences the counter is held in the clear state with both 0-outputs high from a high output of gate WRM. When a write sequence begins a clear signal is generated low to enable the counter. As each low-going pulse occurs at the output of gate WT, counter W0, W1, FIG. 2 is advanced as indicated in the following:

| WT Pulse | W1 State | W0 State |
| --- | --- | --- |
| — | 0 | 0 |
| 1 | 0 | 1 |
| 2 | 1 | 0 |
| 3 | 0 | 0 |

The table shows that counter W0, W1 has three states and returns to the initial state after the third toggle pulse. First, leads W1 and W0 control a portion of the memory address to store the input information in the proper locations, and second, gates WRA0, WRA1, WRA2 decode the counter state to enable the appropriate input signals to random access memory 109 for each of the three write cycles. In the initial state, gate WRAO is on, holding lead $\overline{WROO}$ low and via gate WREO, holding lead WROO high. Gates WRA1 and WRA2 are off. When the counter advances to the next state, gate WRAO turns off, turning on gate WREO and gate WRA1 turns on to make the signal on lead $\overline{WROI}$ low. In the last state, gate WRA1 turns off and gate WRA2 turns on to drive lead $\overline{WR10}$ low. The final function of the counter is ending the write sequence. Thus, when counter W0, W1 has been advanced two states the 0-output of flip-flop W1 goes low to clear flip-flop WE, but also holds gate WS off. Then, after the next toggle the 0-output returns high to turn on gate WS.

Gate WS on turns off gate WRA which, via gate WRE, holds gates WCE, WE, and WT off to stop the write sequence. Flip-flop WEM remains reset until the associated PBX circuitry returns lead $\overline{ANIE}$ high. This turns on gate ANIE, turning off gate ANII to reset time delay ANID. The output of delay ANID goes low to hold gate WRA off and set flip-flop WEM. The write control circuit is now ready to receive a new write enable via lead $\overline{ANIE}$.

FIG. 3-MEMORY ADDRESS (Write and Read Address Counters)

In our exemplary embodiment random access memory 109 can store a maximum of five call identifications. To control the location of these messages, a write address counter is provided. Similarly, a read address counter determines the location of each identification to be read out and transmitted. After each full write or read sequence is completed, the appropriate counter is advanced for the next identification. The read counter follows the same sequence as the write counter to ensure that calls are identified on a first-in, first-out basis. Logic is provided to indicate when the memory is empty or full.

The write address counter consists of JK flip-flops WR1, WR2, WR3, FIG. 3, arranged for a modulo-5 counting sequence. At the start of a write sequence, lead $\overline{WR}$, FIG. 2, goes low. When the sequence ends, lead $\overline{WR}$ returns high. This toggles write address counter WR1, WR2, WR3 to the next state. The order of counting is indicated in the following table.

| WR3 | WR2 | WR1 |
|-----|-----|-----|
| 1   | 0   | 0   |
| 0   | 0   | 1   |
| 0   | 1   | 1   |
| 1   | 1   | 1   |
| 1   | 1   | 0   |

For each call identification, the following information, all binary encoded, is written into the memory. Four digits identifying the calling station are provided by PBX common control equipment 102 directly in binary form. The input trunk circuit identification is translated before storage by means of trunk decoding and translation circuit 104 to a four digit trunk code as required by the serving central office. This trunk code is then stored as part of the call identification. The data channel bit is stored directly.

As described above the random access memory, FIG. 8, has capacity for five call identifications including the message being currently transmitted. An indication, the signal on lead $\overline{ANIB}$ being low as described above, is provided to the associated PBX system when the memory is full. Since each write operation requires only several microseconds, the circuit is arranged such that new call identifications can be stored even during read and transmission periods, provided the memory is not full.

Read address counter, consisting of JK flip-flops RD1, RD2, and RD3, FIG. 3 functions in a manner identical to write address couner WR1, WR2, WR3 described above, At the end of each read and transmission sequence, lead $\overline{RST}$ goes high to advance the counter. The counting cycle is as indicated for the write address counter. Output leads $\overline{WR1}$, WR2, $\overline{WR2}$, WR3 and $\overline{RD1}$, RD2, $\overline{RD2}$, RD3 control the memory address selection, as described later, during the write and read modes, respectively.

Gates AM1 and AM2, FIG. 3, compare the outputs of flip-flops WR1 and RD1. When the two flip-flops are in the same state, both gates will be held off. If the flip-flops are in different states, one of the gates will have both inputs high and turn on, turning gate AM7 off. Similarly, gates AM3 and AM4 and gates AM5 and AM6 compare the states of flip-flops WR2 and RD2 and WR3 and RD3, respectively, turning off gate AM7 if the counters are in different states. If all three stages of the counters are in the same states, that is the addresses agree, gate AM7 will be held on. If the two counters agree gate AM7 is held on since the address determined by each counter is the same, thus indicating that random access memory 109 is either full or empty. Gate AM7 on turns off gate AM8 which now enables gates EMP and FL.

When lead $\overline{RST}$ goes high at the end of a read and transmission sequence, read address counter RD1, RD2, RD3 is advanced, and if it then agrees with write address counter WR1, WR2, WR3, gate EMP turns on. This inhibits read and transmission control circuit, FIG. 9, until another call identification is written into random access memory 109. When lead $\overline{WR}$ goes high at the end of a write sequence, write address counter WR1, WR2, WR3 is advanced. If write and read counters then are in the same state and lead $\overline{RST}$ is low, gate FL turns on to inhibit write control circuit, FIG. 2, and make lead $\overline{ANIB}$ low indicating memory 109 is full.

FIG. 4-MULTIPLEXER FOR FIRST MEMORY ELEMENT

As previously described for each call identification, there are nine pieces of information that must be written into the memory. They include the data channel to be used, the four digit trunk code and the four digit station code. The random access memory, FIG. 8, requires that the information be written in a combined serial-parallel manner. Thus, three digits are written in parallel, followed by a second and third group of three digits to complete the message. As described above, input address counter, WO, W1, FIG. 2, controls the sequential selection of the information to be written.

FIG. 4 shows the multiplexer circuitry for selecting the input data to be written in the first memory segment, RAM O of random access memory, FIG. 8. This information includes the data channel required DC1, the units digit of the trunk code UD-, and the units digit of the station code LIU-. Initially, under control of input address counter, FIG. 2, leads WROO, $\overline{WRO1}$, and $\overline{WR1O}$ are all high. With lead $\overline{WRO1}$ high, gates TUE 1 and TUE 2, FIG. 4 are on, holding gates TCU1, TCU2, TCU4, TCU8 off. This inhibits the trunk code units digit which is present in the form of a low signal on one of the leads UDO-UD9 from trunk decoder 104. Similarly, with lead $\overline{WR1O}$ high, gate WRSU is on, holding gates SU01, SU02, SU04, SU08 off to inhibit the station code units digit. Lead WROO high places gate DCI under control of input lead DCl which is high or low when data channel 0 or 1 is required, respectively. Thus, when data channel 0 is required, gate DCI will be on which holds lead DMOl low. Conversely, for data channel 1, lead DM01 will be high. Leads DM02, DM04, DM08 will all be high. At this time, which is defined by input address counter W0, W1, FIG. 5, the data channel information is written into memory segment RAM O, FIG. 8.

Input address counter W1, W1, FIG. 2, then advances which makes leads WR00 and $\overline{WR01}$ low. Lead WR00 low holds gate DCI off to inhibit the data channel input. With lead $\overline{WR01}$ low, gates TUE 1 and TUE 2 turn off placing gates TCU1, TCU2, TCU4, TCU8 under control of the trunk code units digit signal; one of the UD leads from trunk decoder 104 is low. Gates TCU- translate the digit to binary form on leads DM01, DM02, DM04, DM08. With lead $\overline{WR10}$ still high, gates SU01, SU02, SU04, SU08 remain off. Thus, the trunk code units digit is now present on leads DM0- and is written into memory.

Finally, when input address counter advances to the third state, lead $\overline{WRO1}$ goes high and lead $\overline{WR10}$ goes low. Lead $\overline{WRO1}$ high inhibits the trunk code digit, turning off TCU- gates. Lead $\overline{WR1O}$ low turns of gate WRSU to enable gates SU01, SU02, SU04, SU08, This permits writing the station code units digit as discussed in the following.

The calling station code units digit is present in binary form on leads LIU1, LIU2, LIU4, LIU8, which signals are generated by PBX common control 102. Lead $\overline{ARC}$ is high which holds gate ARC on. Thus, gate ATC is off and places gates SU1, SU2, SU4, SU8 under control of the LIU- leads. These gates drive gates SU01, SU02, SU04, SU08, which repeat the station code units digit on DMO- leads. For calls completing from a PBX attendant, lead $\overline{ARC}$ will be low. This turns off gate ARC, turning on gate ATC to hold SU-gates off which inhibits the information on LIU- leads. For this type call, a station code is assigned by means of strapping in FIELD-A. Thus, the units digit is provided in binary form by cross-connecting the output of gate ATC to the portion of gates SU01, SU02, SU04, SU08 required. Lead $\overline{ATC}$ provides the same signal to the data multiplexer used for the remaining station code digits.

FIG. 5-MULTIPLEXER FOR SECOND MEMORY ELEMENT

FIG. 5 shows the multiplexer which sequentially presents the trunk code thousands MD-, hundreds HD, and tens TD- digits to the second memory segment RAM 1, FIG. 8, under control of input address counter W0, W1, FIG. 2. Initially, lead $\overline{WR00}$ is low and leads $\overline{WR01}$ and $\overline{WR10}$ are high. With lead $\overline{WR01}$ high, gates THE 1 and THE 2 are on, holding gates TCH1, TCH2, TCH4, TCH8 off. This inhibits the trunk code hundreds digit which is present in the form of a low signal on one of the leads HD0 through H9. Similarly, lead $\overline{WR10}$ high inhibits the trunk tens digit by holding gates TC1, TCT2, TCT4, TCT8 off. Lead $\overline{WR00}$ low holds gates TME 1 and TME 2 off, placing gates TCM1, TCM2, TCM4, and TCM8 under control of the trunk code thousands digit since one of leads MD- is low. Gates TCM1, TCM2, TCM4, TCM8 translate the digit to binary form on leads DM11, DM12, DM14, DM18 for writing into random access memory segment RAM 1.

Concurrently input address counter W0, W1, FIG. 2, advances which makes lead $\overline{WR00}$ high and $\overline{WR01}$ low. This inhibits the trunk code thousands digit and places gates TCH1, TCH2, TCH4, TCH8 under control of the trunk hundreds digit information appearing on leads HD0 to HD9 which is translated to binary form on leads DM11, DM12, DM14, DM18 for storage in memory RAM1, FIG. 8. Similarly, for the trunk tens digit, the counter advancing causes lead $\overline{WR01}$ to go high and lead $\overline{WR10}$ to go low which permits the tens digit information to be written into memory.

FIG. 6-MULTIPLEXER FOR THIRD MEMORY ELEMENT

Under control of input address counter, W0, W1, FIG. 2, the multiplexer shown in FIG. 6 makes the station code thousands, hundreds, and tens digits available sequentially for writing into third memory segment RAM 2, FIG. 8. Initially, lead $\overline{WR00}$ is low and leads WR00, $\overline{WR01}$, and $\overline{WR10}$ are high. Lead $\overline{WR01}$ high turns on gates WRSH and WRSH 1 which turns gates SH01 SH02, SH04, SH08 off to inhibit the hundreds digit information. Similarly, lead $\overline{WR10}$ high holds gates ST01, ST02, ST04, ST08 off via gates WRST and WRST 1 to inhibit the tens digit. Lead WR00 high places gates SM01, SM02, SM04, SM08 under control of the thousands digit information and lead $\overline{WR00}$ low turns off gate WRSM to similarly enable gate SM01.

As described above, the station code information to be stored depends on the state of lead $\overline{ATC}$. Thus, when lead $\overline{ATC}$ is high, gates SM1, SM2, SM4, SM8 are enabled to transmit the thousands digit information. For PBX systems using a four-digit station numbering plan, the thousands digit is received from the associated PBX system via leads LIM1, LIM2, LIM4, LIM8 in binary form. However, for 3-digit PBX systems, the thousands digit is provided by means of terminal field cross-connections in FIELD-B. Thus the data input to each SM- gate is strapped to the corresponding input LIM- lead for 4-digit systems, while for 3-digit systems, a portion of the gate inputs are strapped to ground LIM1G, LIM2G, LIM3G, and LIM4G to provide the required thousands digit binary code. In either case, with lead $\overline{ATC}$ high, this code is transferred to leads DM21, DM22, DM24, DM28 via corresponding SM- and SMO- gates. If lead $\overline{ATC}$ is low, indicating a call completing from an attendant, SM1, SM2, SM4, SM8 gates are held off to inhibit the input information and an attendant call identification thousands digit is provided by strapping the low signal on lead $\overline{ATC}$ to a portion of gates SMO1, SMO2, SMO4, SMO8 in FIELD-C. Thus, the binary encoded digit appears on leads DM21, DM22, DM24, DM28.

In a similar manner, as input address counter W0, W1, FIG. 2 advances to the second and third state, the station code hundreds and tens digits are written into memory segment, RAM 2, FIG. 8.

FIG. 7-MEMORY ADDRESS SELECTION

Figure 7:
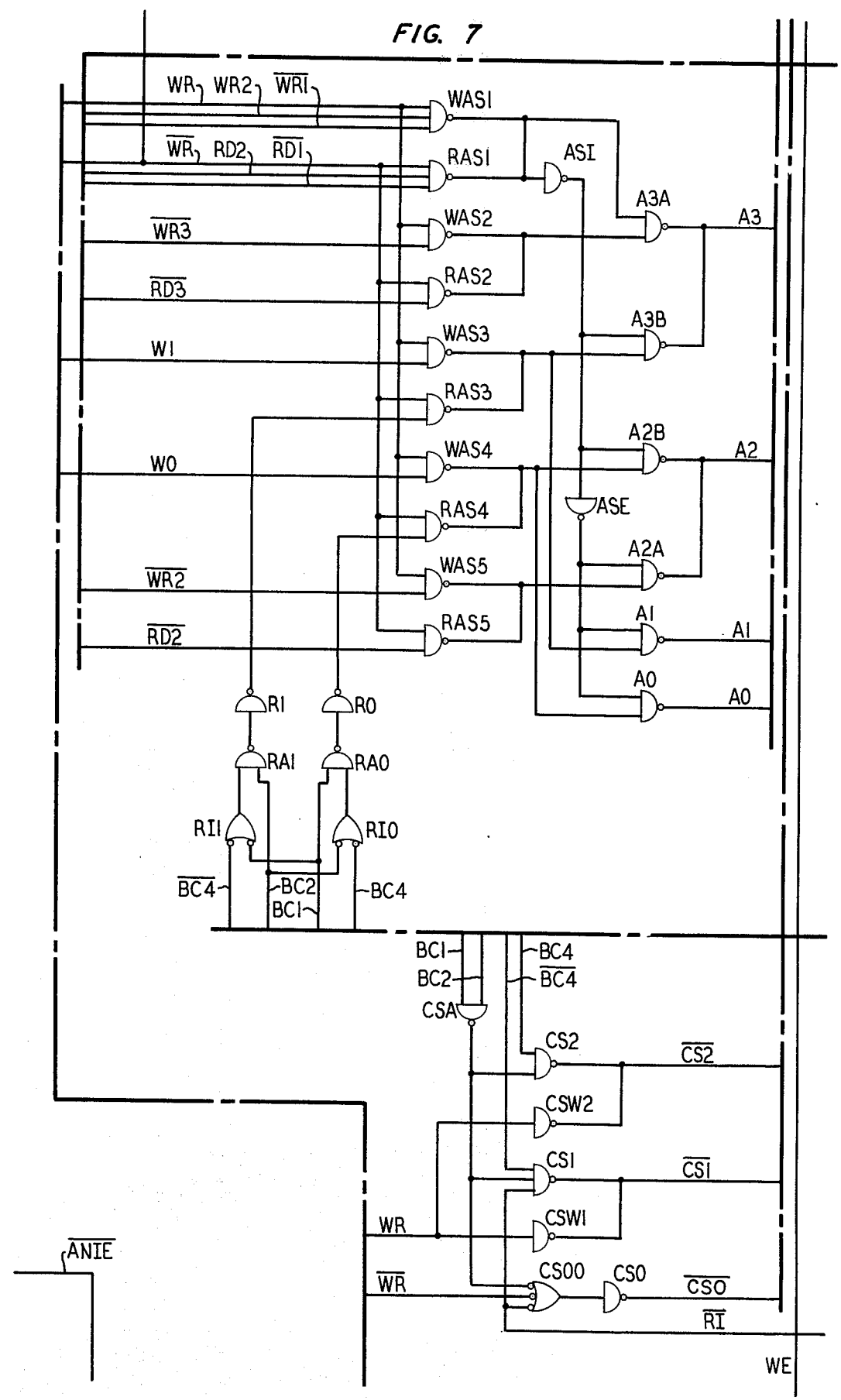

The memory address circuit, FIG. 7, provides the 4-bit binary address to locate the portion of memory to be used as required for each write or read operation. This address is applied to all three memory segments and the required segment or segments are selected by the logic of FIG. 7.

WRITE MODE

When a number identification is being written into the random access memory, FIG. 8, lead $\overline{WR}$ low holds gates RAS (1 through 5), FIG. 7, off to inhibit all read mode address control signals. Lead WR high, from FIG. 2, enables the write mode address control gates WAS (1 through 5). At this time, the state of write address counter WR1, WR2, WR3, FIG. 3, and input address counter, W0, W1, FIG. 2 each determine half the memory address. Thus, when write address counter WR1, WR2, WR3 is in any of the first four states listed above, either lead WR2 or $\overline{WR1}$ low holds gate WAS 1 off. This places gate A3A under control of lead $\overline{WR3}$ via gate WAS 2, and turns gate ASI on. Gate ASI on holds gates A3B, A2B, and ASE off. Gate ASE off enables gates A2A, A1, and A0. Gate A2A is controlled by lead $\overline{WR2}$ via gate WAS 5 and, similarly, gates A1 and A0 are controlled by leads W1 and W0 via gates WAS 3 and WAS 4, respectively. Thus, the state of leads $\overline{WR3}$, $\overline{WR2}$, W1, and W0 is transferred to leads A3, A2, A1, and A0, respectively. In this case, the combination of leads A3 and A2 assume a different binary state for each state of write address counter WR1, WR2, WR3, FIG. 3. Leads A1 and A0 follow the three states of input address counter W0, W1, FIG. 2, directly. Thus, the random access memory 109, FIG. 8 is addressed over leads A0, A1, A2, A3 for the first four identifications.

For storage of the fifth number identification with write address counter WR1, WR2, WR3, FIG. 3, in its last state listed above, gate WAS 1, FIG. 7, turns on, turning off gates A3A and ASI. Gate ASI off enables gates A3B and A2B and via gate ASE holds gates A2A, A1, and A0 off. Gate A3B transfers the signal from lead W1 to lead A3 and gate A2B transfers the signal from lead W0 to lead A2. Gates A1 and A0 off hold leads A1 and A0 high. Thus, for this identification, leads A1 and A0 assume the state not used for the other four identifications while leads A3 and A2 follow the three states of the input address counter.

READ MODE

When the system is not performing a write sequence, a low signal on lead WR inhibits gates WAS1 through WAS5 while lead $\overline{WR}$ high enables the read mode address control gates RAS1 through RAS5. The memory address is then controlled by read address counter RD1, RD2, RD3, FIG. 3 and digit counter BC1, BC2, BC4, FIG. 10. As described above, read address counter RD1, RD2, RD3 provides exactly the same function as write address counter WR1, WR2, WR3, controlling leads A3 and A2 for four of the possible states and leads A1 and A0 when in the fifth state. The digit counter state as decoded by gates RI1, RI0, RA1, RA0 controls gates RAS3, RAS4, via gates R1, R0 provides the remaining portion of the required address, either on leads A1 and A0 or A3 and A2. Thus, read address counter RD1, RD2, RD3 determines which message is to be read out and the digit counter selects the particular digit. Since each digit is read in sequence, further logic, FIG. 7, is used to select the memory segment that is being addressed at a particular time.

Random access memory 109, FIG. 8, is organized into three segments RAM0, RAM1, RAM2, each having individual input data access, but under control of the same address selection circuit, FIG. 7. Also, the memory segment outputs are joined to a common bus BN-. With these characteristics, the following added control is necessary for proper operation.

In the write mode, lead WR high turns on gates CSW1, CSW2 to drive leads $\overline{CS1}$ and $\overline{CS2}$ low. Lead $\overline{WR}$ low turns off gate CS00, turning on gate $\overline{CS0}$ to drive lead $\overline{CS0}$ low. Leads $\overline{CS0}$, $\overline{CS1}$, $\overline{CS2}$, low enable the respective memory segments RAM1, RAM2 to permit writing input data in a parallel manner. Thus, all memory segments are enabled for the complete write sequence.

In the read mode, lead WR low holds gates CSW1, CSW2 off and lead $\overline{WR}$ high places gate CS00 under control of lead $\overline{RI}$ and gate CSA. When a read and transmission sequence begins, lead $\overline{RI}$ goes low momentarily. This turns off gate CS00, turning on gate CS0 to make lead $\overline{CS0}$ low. At this time, leads BC2 and BC1 low hold gate CS4 off. Lead BC4 low holds gate CS2 off and lead $\overline{CS2}$ high while lead $\overline{RI}$ low turns off gate CS1 to make lead $\overline{CS1}$ high. Leads $\overline{CS1}$, $\overline{CS2}$ high inhibit the outputs of memory segments RAM1, RAM2, FIG. 8, respectively, while lead $\overline{CS0}$ low enables readout of RAM 0. At this time, memory address selection circuitry enables readout of the data channel required for the transmission. Lead $\overline{RI}$ then returns high. This turns on gate CS00, turning off gate CS0 to make lead $\overline{CS0}$ high and turns on gate CS1 to drive lead $\overline{CS1}$ low. Lead $\overline{CS1}$ low enables readout of RAM 1 while leads $\overline{CS0}$ and $\overline{CS2}$ high inhibit readout of RAM0, RAM2 memory segments. At this point, under control of digit counter BC-, the trunk code thousands digit is selected for readout. As each succeeding digit is transmitted, the advancing digit counter enables the required memory segment and selects the proper memory address until the complete message is transmitted.

FIG. 8-RANDOM ACCESS MEMORY

The random access memory, FIG. 8, comprises three 64 bit read/write memory segments, RAM0, RAM1, RAM2, each organized 16 words by four bits. When a segment receives a low signal at the $\overline{CS}$- input, the binary address appearing on leads A3, A2, A1 and A0 is decoded to select one of 16 4-bit words. As described above, if the signal on the write enable lead WE is at a high level, the contents of the selected word are non-destructively read out and outputs $\phi0$, $\phi1$, $\phi2$, $\phi3$ reflect the state of the stored data in the four bits of the selected word. If lead WE is low, the data present on data inputs connected to the particular memory segment activated by the particular CS lead are written into the selected word, D0, D1, D2, D3.

When a call identification is written into random access memory, FIG. 8, input address counter W0, W1, FIG. 2, as previously described, steers a digit to the data inputs of each memory segment via the corresponding multiplexer, FIG. 4, 5, 6. As described above, initially RAM 0 input leads contain the data channel bit on lead DMO1 while leads DMO2, DMO4, DMO8 are high. The RAM 1 input is the 4-bit binary coded trunk number thousands digit on leads DM11, DM12, DM14, DM18, while the input to RAM 2 on leads DM21, DM22, DM24, DM28 is the station code thousands digit. The memory location for storage is determined by the state of leads A3, A2, A1, and A0 under control of write address counter WR1, WR2, WR3, FIG. 3, and input address counter W0, W1, FIG. 2. The same location is used in each segment. During the write sequence, leads $\overline{CS0}$, $\overline{CS1}$, $\overline{CS2}$ are low to enable the address decoding. Lead WE pulses low for 1.2 microseconds to write the four bits of each input word into memory.

As previously described input address counter W0, W1, FIG. 2 then advances to control the placing of signals representing the trunk code units digit on the RAM 0 inputs, the trunk hundreds digit on the RAM 1 inputs, and the station code hundreds digit on the RAM 2 inputs. This also changes the address information to select the next storage location. Lead WE then pulses low again to store the digits. Input address counter W0, W1 then advances to the third state which places signals representing the station units digit, trunk tens digit, and station tens digit on the inputs of RAM 0, RAM 1, RAM 2, respectively, and selects the next storage location via the address leads. The final pulse on lead WE writes these digits into the memory.

During a read and transmission sequence, the data channel required and each trunk and station digit is read from memory individually. At this time, the address leads are controlled by read address counter RD1, RD2, RD3, FIG. 3, and digit counter BC1, BC2, BC4 FIG. 10, which will be described below. Also, the segment select leads, $\overline{CS}$-, are controlled by memory address circuitry, FIG. 7, previously described. When the read sequence starts, lead $\overline{CS0}$ goes low and the contents of the memory location containing the data channel bit is read from RAM 0 to lead $\overline{BN1}$. Leads $\overline{BN2}$, $\overline{BN4}$, $\overline{BN8}$ go low, but serve no function at this time. The signals on lead $\overline{BN1}$ control the data channel selection by data channel selector 111 as described above. Lead $\overline{CS0}$ returns high to end this initial readout.

When the first digit is to be transmitted, lead $\overline{CS1}$ goes low to transfer the trunk code thousands digit from memory to leads $\overline{BN8}$, $\overline{BN4}$, $\overline{BN2}$, $\overline{BN1}$ and, via gates BN8, BN4, BN2, BN1 to leads BN8, BN4, BN2, BN1. Similarly, as each digit is required for transmission, the appropriate segment selection lead, i.e., lead $\overline{CS0}$ for RAM0 is driven low under control of digit counter BC1, BC2, BC3, FIG. 10 which also determines the required address location in conjunction with read address counter RD1, RD2, RD3. When the transmission is completed, read address counter RD1, RD2, RD3, is advanced, making the memory locations used available for another call identification. During periods when a digit readout is not required, as determined by read and transmission control circuitry, FIG. 9, new call identifications can be written unless the memory is full.

FIG. 9-READ AND TRANSMISSION CONTROL

Figure 9:
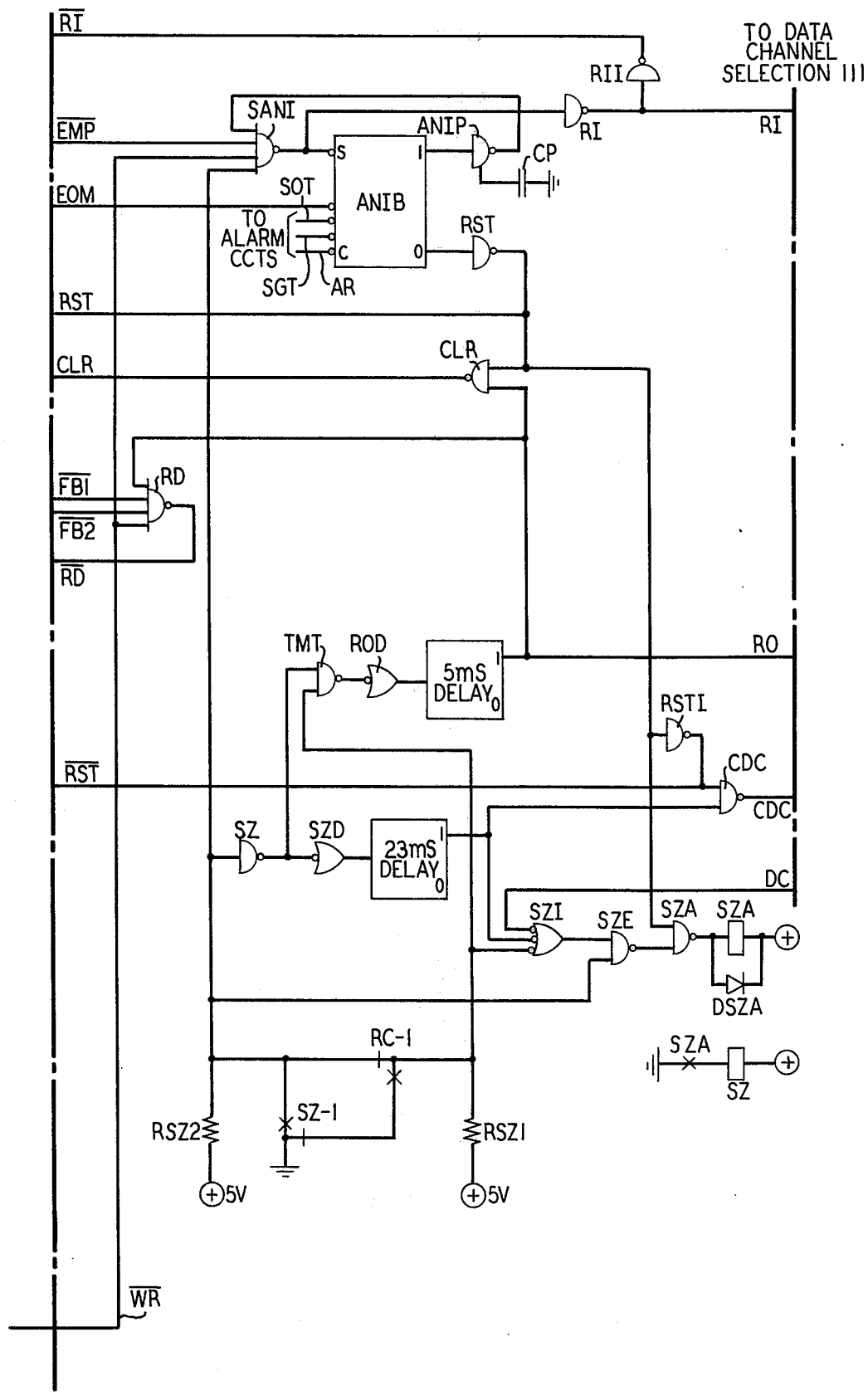

A read and transmission sequence will begin when the memory is not empty (lead $\overline{EMP}$ high), a write sequence is not in progress (lead $\overline{WR}$ high), and relay SZ, FIG. 9, is released. Under these conditions, gate SANI, FIG. 9, turns on, setting flip-flop ANIB to make the 1-output high and the 0-output low. With the 1-output high, gate ANIP is delayed from turning on by capacitor CP for approximately 100 microseconds. Thus gate SANI remains on for this period, holding lead RI high via gate RI and holding lead $\overline{RI}$ low via gate RII. Lead RI high enables data channel selection circuit 111. Lead $\overline{RI}$ low prevents a write sequence from starting at gate WRA, FIG. 2, as described above, controls the readout of the required data channel FIG. 7, and provides a clear signal to any test set control circuits which may be provided. When gate ANIP turns on, gate SANI turns off to make the signal on lead RI low and lead $\overline{RI}$ high.

The low 0-output of flip-flop ANIB turns off gate RST which makes lead RST high, places gate CLR under control of the low 1-output of delay ROD, and turns on gate RSTI. Lead RST high removes the clear signal from flip-flop ME, FIG. 10. Gate RSTI on holds gate CDC off and lead CDC high and makes lead $\overline{RST}$ low. Lead CDC high removes a clear signal from data transfer and channel selector circuit 111. Lead $\overline{RST}$ low holds gate EMP, FIG. 3, off.

Gate RST, FIG. 9, off also places relay circuit SZA under control of gate SZE to prepare for the operation of relays SZA and SZ. Three conditions must be satisfied before relay SZA will operate. First, relay SZ must be released for 23 milliseconds from the previous read and transmission sequence. This delay is useful when data channel switching is required between two transmissions for, in some cases when switching to a new channel, a receiver connected signal (sent by the serving office) will still be present from a previous transmission. To prevent transmitting into this false signal which would result in loss of the identification, the delay in operating relay SZ allows time for a relay in data transmission and channel selector circuit 111 to operate which will block the operation of relay SZ by holding gate SZI off by means of signals on lead DC until the false signal is cleared and the serving office can prepare to receive new data. Thus, when relay SZ is operated, gate SZ is off since ground is applied through contact SZ-1 and time delay SZD is held reset. The low 1-output holds gate SZI off. When relay SZ releases, gate SZ turns on to start the time delay. After 23 milliseconds, the SZD 1-output goes high to enable gate SZI. The second requirement to operate relay SZA is that a relay in data transmission and channel selector circuit 111 be released as just mentioned. Finally, lead DC low will hold gate SZI off and relay SZA released (when data channel 1 is required) until data transmission and channel selector circuit 111 has operated. When all three conditions are satisfied, gate SZI turns on, turning off gate SZE. This turns on relay driver SZA to operate relay SZA which operates relay SZ. Relay SZ operates to ground both resistors RSZ1 and RSZ2, FIG. 9. Resistor RSZ1 grounded holds gate TMT off until the data transmission and channel circuit 111 has operated. Resistor RSZ2 grounded turns off gate SZ, and holds gates SANI and SZE off. Gate SZ off resets time delay SZD and places gate TMT under control of data transmission and channel selector circuit 111. Relay SZ operated signals the serving office that a message is waiting to be transmitted.

When the distant end is ready to receive the data a return signal will cause a relay to operate in data transmission and channel selection circuit 111, which opens contacts RC-1 and removes resistor RSZ1 from ground. This high signal turns on gate TMT, which starts time delay ROD. After 5 milliseconds, the 1-output going high enables gate RD, turns on gate CLR to make lead CLR low and makes lead RO high. Lead CLR low removes the clear signal from five bit counter FB1, FB2, FB3 and digit counter, BC1, BC2, BC3, FIG. 10 and message register, 110. Lead RO high starts a clock pulse generator in data transmission and channel selector circuit 111, to begin the transmission of data.

Figure 10:
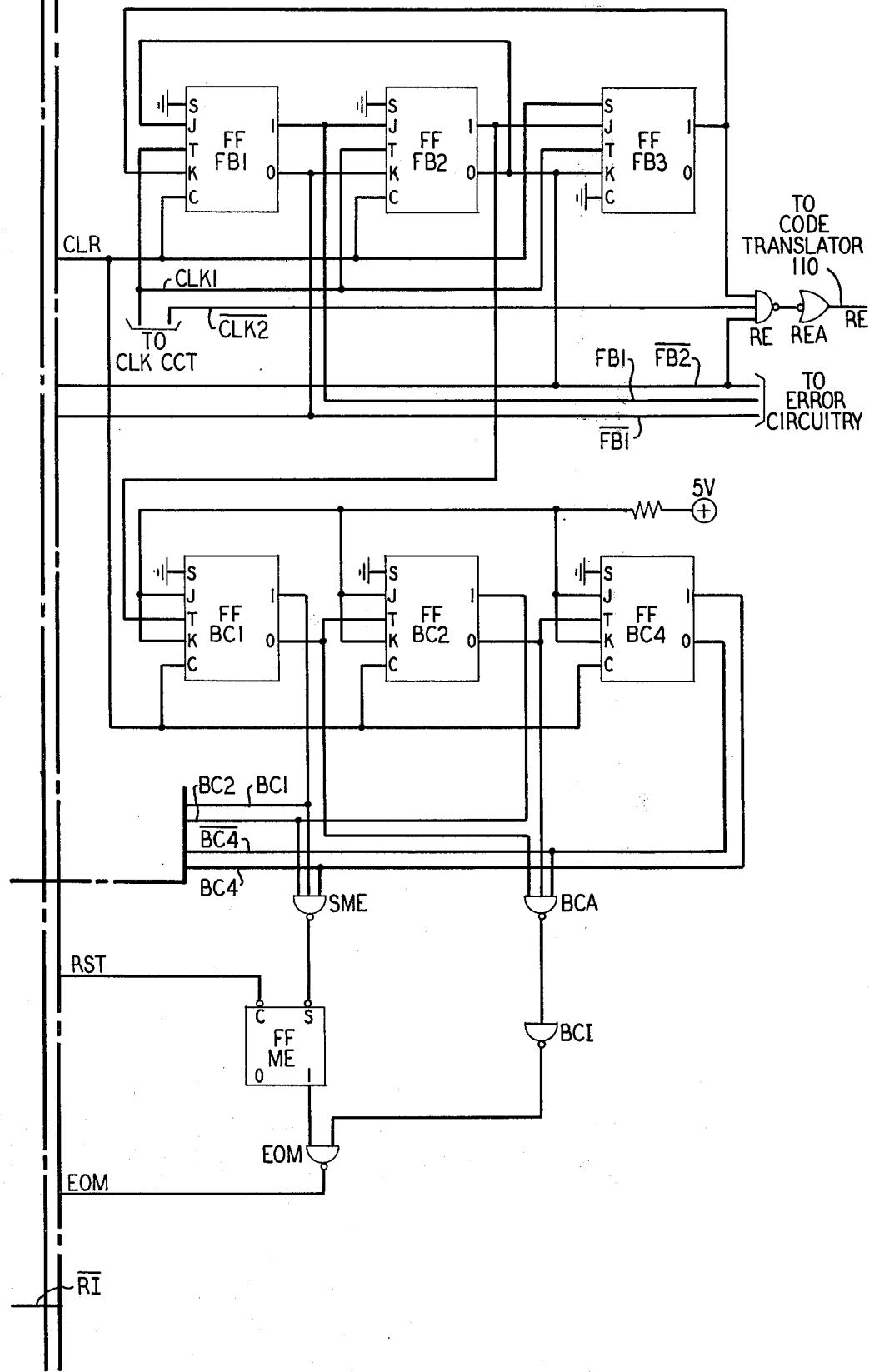

At this time, leads $\overline{FB1}$ and $\overline{FB2}$ from five bit counter FB1, FB2, FB3, FIG. 10, are both high. Also, provided a write sequence is not in progress, lead $\overline{WR}$ will be high. Thus, when delay ROD times out, gate RD will turn on to drive lead $\overline{RD}$ low. This will inhibit gate WRA, FIG. 2, to prevent a write sequence until the first digit to be transmitted is read from memory. Should a write sequence be in progress, this operation will be delayed momentarily. As the first data bit is transmitted, five bit counter, FB1, FB2, FB3 FIG. 10, also changes state which makes the signal on lead $\overline{FB1}$ low. This turns off gate RD to make lead $\overline{RD}$ high. Until five bits of the message have been shifted from the message register and transmitted, five bit conter FB1, FB2, FB3, FIG. 10, cycles through states which cause either lead $\overline{FB1}$ or $\overline{FB2}$ to be low. Thus, gate RD remains off. As the fifth bit is transmitted, five bit counter FB1, FB2, FB3, FIG. 10 returns to the initial state with leads $\overline{FB1}$ and $\overline{FB2}$ high which turns gate RD on. This operation continues for the remainder of the transmission to ensure that a write sequence will not interrupt the digit readout periods.

To end a read and transmission sequence, flip-flop ANIB, FIG. 9, is reset by a low signal on lead EOM generated at FIG. 10 as described below after the complete message has been transmitted. Alternately, lead SOT or SGT, FIG. 9, low will reset the flip-flop ANIB to permit new call identification attempts when a system failure time-out or signaling failure time-out occurs, respectively. Also, the flip-flop ANIB is forced to the reset condition when power is initially applied or when the AR key is operated by a low signal on lead AR.

With flip-flop ANIB reset, the low 1-output turns off gate ANIP to partially enable gate SANI in preparation for the next identification. The high 0-output turns on gate RST which turns off gates CLR, RSTI, and SZA and makes lead RST low. Gate CLR off maintains the five-bit counter and digit counter, FIG. 10, message shift register 110, in the idle state by means of a high on lead CLR. Gate RSTI off places gate CDC under control of time delay SZD and via lead $\overline{RST}$ advances read address counter RD1, RD2, RD3, FIG. 3, and enables gate EMP, FIG. 3. Lead RST low resets flip-flop ME, FIG. 10.

Gate SZA off releases relay SZA, causing the transmission request relay SZ to release. Relay SZ released opens resistor RSZ2 from ground to turn on gate SZ and enable gates SZE and SANI. Gate SZ on turns off gate TMT to reset time delay ROD and starts time delay SZD. The control circuit is now able to begin a new read and transmission sequence although delay SZD is still timing. When time out occurs, relay SZ is partially enabled for operation as described above. If no new read and transmission sequence has begun, the high 1-output of delay SZD turns on gate CDC to signal the release of the data transmission and channel selector circuit 111 via lead CDC.

FIG. 10-DIGIT AND 5-BIT COUNTERS

Five bit counter FB1, FB2, FB3, FIG. 10 advances as each message bit is transmitted. During each 5-count cycle a digit is transferred from random access memory 109 to the message register circuitry 110 and error checked and digit counter BC1, BC2, BC4, FIG. 10 is advanced. Digit counter BC1, BC2, BC4, FIG. 10 determines the location of each digit to be read from memory and provides the end of message reset.

The five bit counter consists of JK flip-flops FB1, FB2, and FB3 arranged to sequence through five states identical to those listed above for write address counter, WR1, WR2, WR3, FIG. 3. When idle, the counter is held in the initial state by lead CLR high. When transmission begins, lead CLR goes low and the clock pulses on lead CLK1 advance the counter. In the initial state, gate REA is enabled which transfers the first $\overline{CLK2}$ pulse to lead RE. This enables the transfer of the 2-of-5 decoded trunk thousands digit to message register circuitry 110. The first clock pulse on lead CLK1 then advances the counter which inhibits gate REA and via leads $\overline{FB2}$, FB1, and $\overline{FB1}$ enables a digit error check, if required, by error checking circuitry well known in the art. The second clock pulse on lead CLK1, advancing the counter, causes the 1-output of flip-flop FB2 to go high which toggles the digit counter. After three more CLK1 pulses, five bit counter FB1, FB2, FB3, FIG. 10, again enables gate REA for transfer of the next digit to message register circuitry 110. This sequence continues for the duration of the message. Each time five bit counter 108 is in the initial state, a digit is read into message register circuitry 110, the next stage enables an error check, and the third state advances digit counter BC1, BC2, BC4.

Digit counter BC1, BC2, BC4 is a 3-stage JK flip-flop counter, well known in the art, which toggles during each cycle of five bit counter FB1, FB2, FB3 as described above. The counter state determines which memory location is addressed to read each digit for transmission. After all eight digits have been read out, the digit counter turns on gate SME to set flip-flop ME. With one more cycle of the five bit counter which permits the last digit to be transmitted, the digit counter returns to the initial state. This turns on gate BCA, turning off gate BCI. Gate EOM turns on to end the read and transmission sequence by resetting flip-flop ANIB via lead EOM as described above, thus indicating that a complete identification message has been transmitted to the central office.

The above-described arrangement is illustrative of the application of the principles of the invention. Other embodiments may be devised by those skilled in the art without departing from the spirit and scope thereof.

The two data channels are disclosed and described as extending from the PBX to a single central office. If desired, the two channels could extend to two different offices to serve calls selectively extended by the PBX to the two offices.

We claim:

1. In a telephone system having a PBX, a central office, and trunks interconnecting said PBX with said central office, said PBX comprising:
    a switching network having lines connected to its line side and said trunks connected to its trunk side,
    means responsive to the initiation of calls by a plurality of calling lines each requesting access to said central office for selecting a different idle one of said trunks for connection to each of said calling lines,
    means responsive to each selection of an idle trunk on a call for identifying the calling line and the selected trunk for said call,
    a memory having storage locations with a capacity for storing line and trunk identity information for a predetermined number of said calls,
    means responsive to each identification by said identifying means on a call for entering the calling line and trunk identity information into vacant locations of said memory,
    means including said memory for inhibiting said selecting means when said memory has reached its storage capacity and is unable to store additional call identity information,
    means responsive to each identification by said identifying means when said selection means is not inhibited for establishing a network connection from each of said calling lines to its selected trunk,
    a data channel interconnecting said PBX with said central office, and
    means for transmitting said identify information in said memory over said data channel to said central office.

2. The system of claim 1 further comprising:
    means interconnected with said memory for determining when the identity information stored in said memory for a number of calls equals said predetermined number,
    means operative upon a determination by said determining means that said number is less than said predetermined number for activating said selecting means to select an idle one of said trunks for a calling line requesting said access on a subsequently initiated call,
    said identifying means being responsive to said last named selection for identifying the subsequent calling line and its selected trunk,
    said establishing means being responsive to the identity information from said identifying means for connecting said subsequent calling line via said network to its selected trunk,
    means for entering said line and trunk identity information for said subsequently initiated call from said identifying means into an unoccupied storage location of said memory, and
    means operative upon a determination by said determining means that said number equals said predetermined number for preventing said selection of an idle trunk for said subsequent calling line.

3. The system of claim 1 wherein said identifying means further assigns one of a plurality of data channels to each of said calling lines and said memory stores said assigned data channel identity in association with said identity information for each of said calling lines.

4. In a switching system,
    a switching network having lines connected to its line side and central office trunks connected to its trunk side, means for detecting the receipt from a calling one of said lines of a dialed prefix digit signifying a request for a network connection to an idle one of said trunks, a memory for storing call identity information for the calling ones of said lines dialing said prefix digit, said memory being limited in its capacity for concurrently storing said identity information for a predetermined number of calls, means responsible to said prefix digit detection for determining whether said memory is currently capable of storing additional call identity information, first means responsive to a storing determination by said determining means that said memory is capable of storing additional identity information for identifying said calling line, second means responsive to said storing determination for selecting an idle one of said trunks and for identifying said selected trunk, said network being responsive to the identification information from said first and second means for establishing a connection between said calling line and said selected trunk, means responsive to said network connection for providing central office dial tone to said calling line, means including said memory being responsive to said storing determination for entering the identity information of said calling line and said selected trunk from said first and second means into said memory, a data channel, and means operative whenever said memory contains any identity information for transmitting said stored identity information from said memory over said data channel to a central office.

5. The system of claim 4 wherein said identity informaton for any subsequent calling ones of said lines is stored in said memory in a manner so that the first identity information stored in said memory is the first to be transmitted by said transmitting means to said central office.

6. The system of claim 5 in which said memory is a random access memory.

7. An automatic number identification arrangement for use in a PBX, said PBX having a switching network with lines connected to its line side and central office trunks connected to its trunk side, said PBX further having means for detecting the receipt of a dialed central office prefix digit on a call from a calling one of said lines, and means for establishing a network call connection between said calling line and a selected one of said central office trunks, said automatic number identification comprising:

a random access memory for storing line an trunk identity information for said call connection, said memory being limited in capacity for concurrently storing identity information for a predetermined number of calls, means responsive to said prefix digit detection for determining whether said memory is capable of storing said line and trunk identity information for said call, means responsive to a determination by said determining means that said memory is capable of storing said line and trunk information for said call for activating said establishing means to establish said network connection, means responsive to the activation of the establishing means for identifying said calling line and said selected trunk, and means responsive to the above said identification for entering the calling line and selected trunk identity information into said memory.

8. The system of claim 7 further comprising:

means for translating said identity information of said call from said identifying means into a first set of four-digit binary signals representing said calling line and into a second set of four-digit binary signals representing said selected trunk, and means for entering both sets of said binary signals into said memory by said entering means.

9. The system of claim 8 further comprising:

means for effecting the output of each set of four-digit binary signals of said call from said memory, means interconnected at the output of said memory for converting said four-digit binary signals of said call into two-out-of-five code signals, and means responsive to said effecting means for transmitting said two-out-of-five code signals of said call from said PBX to said central office.

10. The system of claim 9 wherein said transmitting means comprises:

a plurality of data channels for connecting said converting means to said central office, and circuitry responsive to said network connection for said call for selecting one of said data channels for transmission of said two-out-of-five code signals for said call.

11. The system of claim 10 further comprising:

means in said central office for signaling said PBX over said selected data channel when said central office is ready to receive said two-out-of-five code signals for said call, and means in said PBX responsive to said central office ready signal for enabling said effecting means to output said four-digit binary signals of said call.

12. In a telephone switching system having a PBX, a central office, data channels and central office trunks interconnecting said PBX with said central office, a switching network in said PBX having stations connected to its line side and said central office trunks connected to its trunk side, common control equipment in said PBX responsive to a call from one of said stations requesting access to said central office for interconnecting said one calling station via said network with one of said trunks, said PBX having automatic number identification equipment comprising:

means operative with said network interconnection for identifying said calling station and said connected trunk, a memory having a predetermined number of storage locations for storing station and trunk identity information for a plurality of calls requesting said access, means responsive to said identification of said calling station and said connected trunk by said identifying means for entering the identities of said calling station and said connected trunk into a vacant one of said locations in said memory, means operative whenever said memory contains said station and trunk identity information corresponding to either one or a plurality of calls for signaling said central office over one of said data channels that said PBX is ready to transmit call identification information, means in said central office responsive to said ready signal from said PBX for signaling said PBX over said data channel that said central office is ready to receive said call identificaton information, means responsive to said signal from said central office to output station and trunk identity information for one of said calls from said memory, and means responsive to the outputted information from said memory for transmitting said station and trunk identity information of said one call over said data channel to said central office.

13. A method of identifying calls in a telephone switching system having a PBX, a central office, at least one data channel and a plurality of trunks interconnecting said PBX with said central office, common control equipment in said PBX responsive to call from a calling one of said stations requesting access to said central office for interconnecting said calling station via said network with one of said trunks, said method comprising the steps of:

identifying in cooperation with said network interconnection the calling station and the connected trunk of said call, entering the identity information for the calling station and the connected trunk for said call into a memory having capacity for storing identity information for a predetermined number of calls, signaling the central office over said data channel that the PBX is ready to transmit call identity information whenever said memory contains identity information corresponding to one or a plurality of calls, signaling the PBX over said data channel that the central office is ready to receive call identity information, reading identity information for at least one of said calls from said memory in response to the above ready signal, transmitting the identity information for said one call from said PBX to said central office over said data channel in response to the reading of said memory, and inhibiting the network interconnection of a calling station with one of said trunks whenever the call identity information in said memory corresponds to said predetermined number of calls.

* * * * *